United States Patent

[11] 3,589,826

[72] Inventor Willis S. Fenn
    Livonia, Mich.
[21] Appl. No. 852,736
[22] Filed Aug. 25, 1969
[45] Patented June 29, 1971
[73] Assignee TRW Inc.
    Cleveland, Ohio

[54] DRILL BIT
    2 Claims, 9 Drawing Figs.
[52] U.S. Cl. .................................................. 408/226
[51] Int. Cl. ..................................................... B27g 15/00,
                                                              B23b 51/02
[50] Field of Search.......................................... 145/116,
    117; 10/140, 141; 77/70, 71, 67, 60; 306/28, 30;
    287/126; 279/56, 48, 69, 89

[56] References Cited
    UNITED STATES PATENTS
    1,209,362  12/1916  Turner ........................ 77/71
    3,136,347  6/1964   Linquist ...................... 145/117

Primary Examiner—Robert C. Riordon
Assistant Examiner—Michael Koczo, Jr.
Attorney—Whittemore, Hulbert & Belknap ABSTRACT: A drill bit having a shank provided with portions of different cross-sectional configuration to enable use of the bit in conventional chucks having either two, three or more jaws.

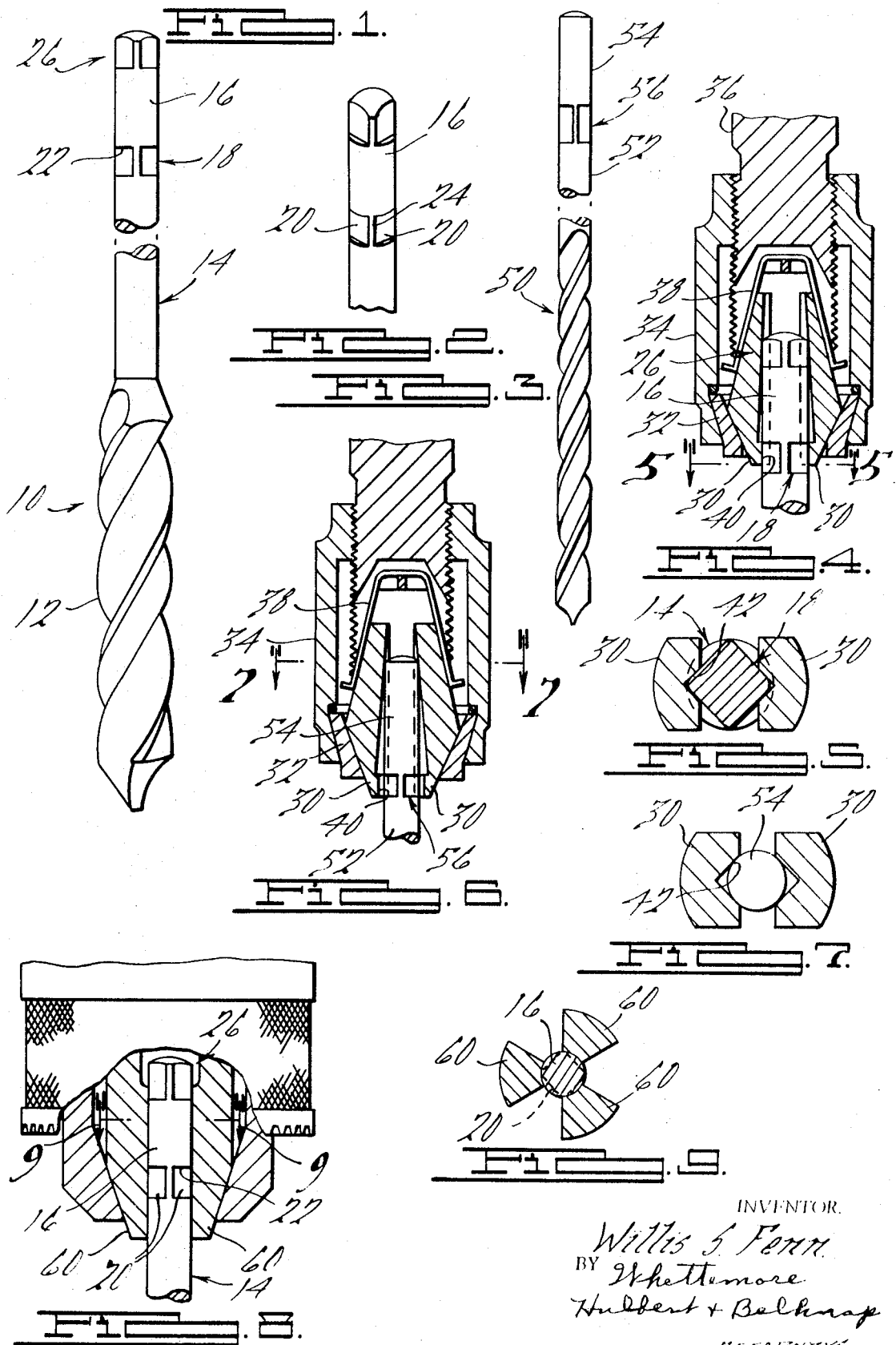

DRILL BIT

Conventional hand braces are generally provided with chucks having two jaws which requires that drill bits to be used therein be provided with a shank portion having a specific configuration enabling it to be securely gripped by the jaws of the chuck. Customarily drill bits for use with the conventional two-jaw chuck in a hand brace have been provided with a shank having its outer end of tapered square configuration. The chucks used in power drills are usually provided with chucks having three jaws which are not adapted to receive and grip a drill bit shank designed to be used with a two-jaw chuck. It has therefore been customary to manufacture two or more different types of drill bits, each of which is specifically adapted for use with only one type of chuck.

It has been proposed to manufacture drill bits having both round and square cross-sectional areas, as in U.S. Pat. No. 2,029,447, but the construction disclosed in such patent has the obvious disadvantage of requiring the user to cut off a portion of the shank at a selected point determined by the type of chuck in which the bit is to be used. This has the further disadvantage of eliminating any possibility of subsequently using the bit in a different type of chuck. It has also been proposed in U.S. Pat. No. 3,136,347 to provide a shank having areas of different cross-sectional shapes to adapt the same for different types of chucks without cutting off any part of the shank. However, the construction disclosed in the last-mentioned patent requires the use of a specially designed chuck when the shank is to be gripped on the round portion thereof.

The present invention provides a shank for a drill bit which is formed so as to adapt the same for use with chucks having two, three or more jaws, and accordingly the shank is provided with a round portion at its outer end and is provided with a generally square portion inwardly from the outer end so that the square portion of the shank may be gripped in a conventional two-jaw chuck while the round portion is adapted to be gripped by the jaws of a conventional three-jaw chuck. The dimensions of the square portion of the shank relative to the diameter of the round portion thereof are such that the bit may be used interchangeably in two or three jaw chucks without interference and without the necessity of cutting off any part of the shank, thereby enabling the same to be used with any conventional chuck throughout the life of the drill bit.

In the drawings:

FIG. 1 is an elevational view of a drill bit according to the present invention;

FIG. 2 is a fragmentary perspective view of the shank of the drill bit shown in FIG. 1;

FIG. 3 is an elevational view of a modified form of the invention;

FIG. 4 is a fragmentary sectional view of the drill bit shown in FIG. 1, showing the same in use in a conventional two-jaw chuck;

FIG. 5 is a sectional view taken on line 5–5 of FIG. 4;

FIG. 6 is a fragmentary sectional view showing the drill bit shown in FIG. 3 gripped by the chuck shown in FIG. 4;

FIG. 7 is a sectional view taken on line 7–7 of FIG. 6;

FIG. 8 is a fragmentary sectional view of the drill bit used with a conventional three-jaw chuck; and FIG. 9 is a sectional view taken on line 9–9 of FIG. 8.

In FIGS. 1 and 2 there is illustrated a drill bit 10 having a fluted portion 12 and a shank 14 having a portion 16 at its outer end which is of round cross section. The shank is provided with a generally square portion 18 inwardly along the shank from the round portion 16. The square portion 18 comprises four flats 20 with the dimension across a pair of opposed flats 20 being less than the diameter of the round portion 16 to define outwardly facing shoulders 22. The flats 20 are dimensioned so that they do not intersect in sharp corners but terminate in the surface of the shank to define narrow bands 24 which separate the adjacent flat surfaces 20. The bands 24 conform to the surface of the round portion 16 of the shank.

The dimension across the flats of the square portion 18, while less than the diameter of the round portion 16, is preferably only slightly greater than the largest dimension which would result in the intersection of the flats in sharp corners, thereby to provide flats having sufficient area for adequate gripping by the jaws of the chuck and defining shoulders 22 of substantial depth for a purpose to be described.

The shank 14 may also be provided with a similar square portion 26 at its outer end with the sides thereof parallel to the sides of the flats 20 of the square portion 18 and of the same dimensions. The drill bit 10 is shown in FIG. 4 inserted into a conventional two-jaw chuck which contains a pair of jaws 30 adapted to receive the end of the shank therebetween and which are cammed inwardly into gripping engagement with the shank by a tapered cam member 32 when the sleeve 34 is threaded inwardly on the drive shaft 36. A spring member 38 tends to urge the inner ends of the jaws 30 toward each other.

When used with a two-jaw chuck of the type described, the shank is inserted until the flats 20 are in position for engagement by the lower ends or gripping portions 40 of the jaws 30. The jaws 30 are provided with V-shaped grooves 42, the sides of which are perpendicular, and which are adapted to receive opposite corners of the square portion 18. The V-shaped grooves 42 extend along the entire length of the jaws, but inwardly of the gripping portions 40 thereof such grooves are recessed outwardly and taper upwardly along the length of the jaws. The sides of the grooves 42 in the end portions 40 of the jaws do not always intersect in sharp corners and the dimensions of the flats 20 as described above therefore provide face-to-face engagement of the jaws with the flats 20. The square portion 26 at the outer end of the shank is also adapted to seat within the grooves at the upper end of the jaws to provide a secure gripping of the jaws at spaced points along the shank 14. The provision of the squared portion 26 at the outer end of the shank is not necessary to provide adequate gripping of the shank in a two-jaw chuck, particularly in smaller size drill bits such as that shown in FIG. 3, but the additional squared portion may be desirable in larger size drills, not only to provide a second gripping surface, but also to eliminate any possible interference between the end of the shank and the inner portions of the jaws in some types of chucks.

With the shank gripped as shown in FIG. 4, the portions 40 of the jaws will engage behind the shoulders 22 defined by the flats 20 to prevent accidental withdrawal of the bit from the chuck.

FIG. 3 illustrates a drill bit 50 of smaller size than the bit 10 and having a shank 52 provided with a round portion 54 at its outer end and a square portion 56 having the same shape as the squared portion 18 of the drill bit 10. FIG. 6 illustrates the gripping of the drill bit 50 in a two-jaw chuck of the kind described above. In this form of the invention the gripping of the square portion 56 is the same as described in reference to FIG. 4, while the round outer end of the shank seats in the grooves 42 in the manner shown in FIG. 7 to grip the shank at axially spaced points thereby stabilizing the bit.

FIG. 8 illustrates use of the drill bit 10 in a three-jaw chuck having three equally spaced jaws 60 which are adapted to grip the round portion 16 of the shank without interference from the square portion 18 or 26. The entire length of the shank 14 may be of the same round cross section so that the jaws 60 may grip the round portion 16 above the square portion 18 or both above and below the square portion 18, as shown in FIG. 8.

The present invention provides a drill bit of inexpensive construction which adapts the same for either two or three jaw chucks or even four jaw chucks without the necessity of the user cutting off or otherwise modifying any part of the shank. The shank construction described has been found to be capable of use with all types of conventional two jaw chucks as well as three jaw chucks.

What I claim as my invention is:

1. A drill bit for use in either two three-jaw three jaw chucks, having a shank portion of round cross section adjacent its outer end, and a generally square portion disposed inwardly along the shank from said round portion, the dimension across the flats of said square portion being less than the diameter of said round portion to define a shoulder facing toward the drill end of said bit, said dimension being such that adjacent flats do not meet in sharp corners but are separated by a narrow band of said round portion, said round portion being adapted to be gripped by the jaws of a conventional three-jaw chuck, said square portion being adapted to be gripped by a conventional two-jaw chuck with the jaws thereof engaging said flats and said shoulder to prevent accidental withdrawal of said bit.

2. A drill bit according to claim 1 wherein said shank is provided with a second generally square portion at its outer end, said second square portion having substantially the same dimensions as the first-mentioned square portion and also adapted to be gripped by the jaws in a two-jaw chuck.